US006263353B1

(12) United States Patent
Gross et al.

(10) Patent No.: US 6,263,353 B1
(45) Date of Patent: Jul. 17, 2001

(54) METHOD AND APPARATUS FOR CONVERTING BETWEEN DIFFERENT DIGITAL DATA REPRESENTATION FORMATS

(75) Inventors: Danny B. Gross; Michael D. O'Donnell; Brian L. Borgeson, all of Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/251,495

(22) Filed: Feb. 17, 1999

(51) Int. Cl.$^7$ ........................................................ G06F 7/00
(52) U.S. Cl. ................................ 708/204; 341/55; 711/220
(58) Field of Search ........................... 708/204; 341/55; 711/220

(56) References Cited

U.S. PATENT DOCUMENTS 5,991,863 * 11/1999 Dao et al. ............................. 711/220
6,101,521 * 8/2000 Kosiec .................................. 708/204
6,189,086 * 2/2001 Yamaura .............................. 711/220

* cited by examiner

Primary Examiner—Tan V. Mai
(74) Attorney, Agent, or Firm—Williams, Morgan & Amerson

(57) ABSTRACT

A method and apparatus for converting digital data representations, such as network addresses of different computer networks. Input data, which in one embodiment includes a hexadecimal network address, contains a plurality of bytes, with each byte having a plurality of digits arranged in positions. A first set of digits from the bytes is selected having a first digit position. The digits in the first set are shifted to a second digit position to generate a first resultant. A second set of digits is selected having a third digit position. The digits in the second set are shifted to a fourth digit position to generate a second resultant. The first and second resultants are summed to generate a converted output network address.

21 Claims, 4 Drawing Sheets

METHOD AND APPARATUS FOR CONVERTING BETWEEN DIFFERENT DIGITAL DATA REPRESENTATION FORMATS

BACKGROUND OF THE INVENTION

1. Field of the Invention

The present invention relates generally to digital data generation and communication, and, more particularly, to a method and apparatus for converting between different digital data representation formats.

2. Description of the Related Art

Certain hardware, software and networking applications send and receive digital data representing an address in varying ways, depending on the specific implementation and governing protocol. In one known canonical representation, bits (e.g., typically 8 bits) defining each byte of a typical network address are grouped into two 4-bit digits. Each digit is represented by a hexidecimal character between 0 and F, with F corresponding to a decimal value of 15. The bits are sent such that the least significant digit of the byte is sent first, followed by the most significant digit. In other words, the order of the digits that make up each byte is reversed. In a non-canonical representation, the bits of the entire address are sent in a most significant bit (MSB) to least significant bit (LSB) order, without regard to digit groupings. At the receiving end, the received bits must be interpreted, and, thus, it is necessary that the transmission algorithm being used be known to allow for the correct decoding of each digit and the whole network address.

To illustrate the two types of address communication techniques, consider the decimal number 168. Converted into a hexadecimal notation (i.e., base 16), this decimal number translates to 0xA8h, or 1010 1000 in binary. This is "MSB first," non-canonical representation of the number (i.e., MSB to LSB). In a communication system that transmits data non-canonically, the bits are transmitted in exactly this order (i.e., 1-0-1-0-1-0-0-0), and then reassembled on the receiving end. A communication system that transmits the number in a least significant digit first, canonical format reverses the order of digits (i.e., 1-0-0-0-1-0-1-0). A direct translation of the received binary pattern to hexadecimal notation yields 0x8Ah, instead of the intended 0x5lh. Accordingly, if the receiving end incorrectly assumes the transmission scheme being employed, the received address will be incorrect.

In one exemplary communication network, the Fiber Distributed-Data Interface standard (FDDI) establishes a protocol for data transmission on fiber optic lines in a local area network (LAN) where network addresses are sent and received in a MSB first, non-canonical hexadecimal representation. In contrast, the Ethernet protocol, a widely used LAN technology, sends and receives the hexadecimal address in a least significant digit first, canonical representation. Often for error tracking, problem investigation, and fault correction, log files including addresses are created. An analyst trying to trace a troublesome fault typically analyzes both FDDI and Ethernet log files. As described above, network addresses are recorded in differing formats, and the analyst typically manually converts the network addresses of one type to addresses of the other type for comparison and analysis. This conversion is time consuming, and, due to the repetitive nature of the task, error prone.

One example of the problem is illustrated by a trace file. An FDDI machine transmits a certain frame to an Ethernet machine. In the FDDI trace logs, the transmitted address is represented as the non-canonical form of the Ethernet address. However, on the Ethernet machine, the same packet is decoded and logged as if coming from a canonical source.

In network monitoring applications, data is mostly coded using a canonical representation, but the actual FDDI trace logs shows the addresses in non-canonical form. For example, the Solaris™ operating system, offered by Sun Microsystems, presents the FDDI media access control (MAC) address, a computer's unique hardware number, in Ethernet form, but logs the network activity in the FDDI form. This forces the system analyst to manually convert the logged addresses into Ethernet form for further manipulation, research, or other activities. As stated above, the time requirements and likelihood of human error involved in executing these translations is quite high. There are many situations, other than just those related to the interpretation of network logging and trace files, where translations between canonical and non-canonical are required.

The present invention is directed to overcoming, or at least reducing the effects of, one or more of the problems set forth above.

SUMMARY OF THE INVENTION

In one aspect of the present invention, a method is provided for converting digital data representations. The method includes receiving input data that includes a plurality of bytes, each byte having a plurality of digits arranged in positions. A first set of digits are selected from the bytes having a first digit position. The digits in the first set of digits are shifted to a second digit position to generate a first resultant. A second set of digits are selected from the bytes have a third digit position. The digits in the second set of digits are shifted to a fourth digit position to generate a second resultant. The first and second resultants are combined to generate output data.

In another aspect of the present invention, an apparatus is provided. The apparatus includes a processor adapted to receive input data that includes a plurality of bytes, each byte having a plurality of digits arranged in positions. The apparatus further includes a program storage device coupled to the processor and adapted to store instructions. The instructions, when executed by the processor, perform a method. The method includes selecting a first set of digits from the bytes having a first digit position, and shifting the digits in the first set of digits to a second digit position to generate a first resultant. A second set of digits is selected from the bytes having a third digit position, and the digits in the second set are shifted to a fourth digit position to generate a second resultant. The first and second resultants are combined to generate output data.

BRIEF DESCRIPTION OF THE DRAWINGS

The invention may be best understood by reference to the following description taken in conjunction with the accompanying drawings, in which like reference numerals identify like elements, and in which.

Figure 1:
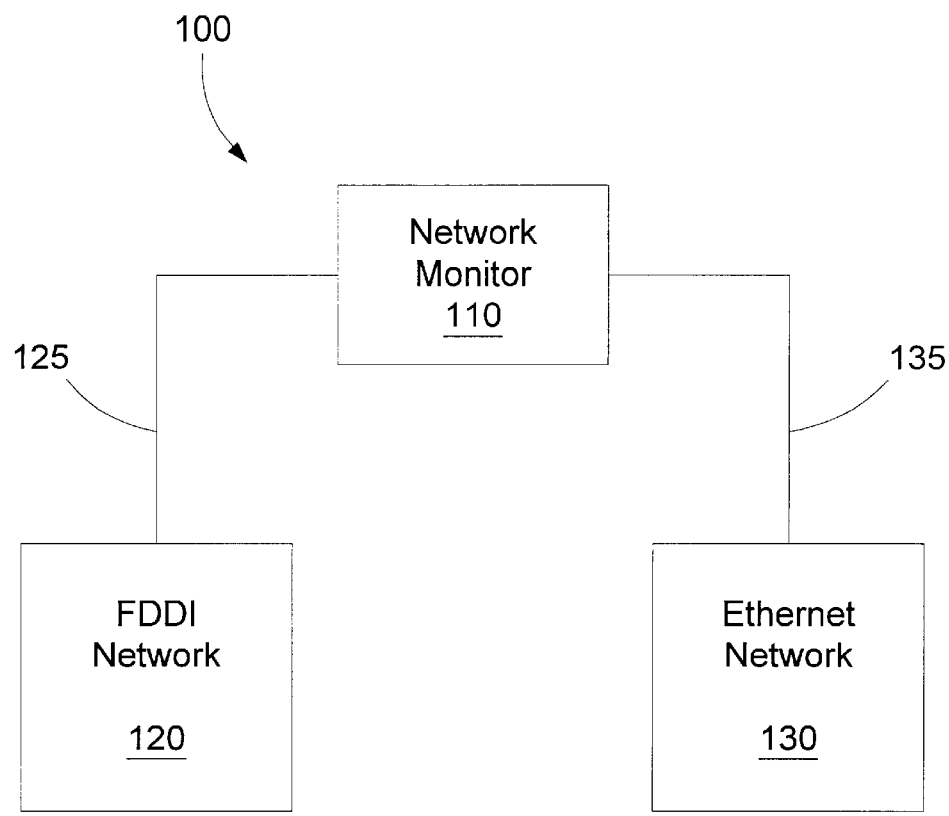
FIG. 1 is a simplified block diagram of a computer system for converting digital data representations in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of a computer system 100 for converting between different digital data representation formats, such as network addresses, for example, is shown. The computer system 100 includes a network monitor 110 coupled to a fiber distributed-data interface (FDDI) network 120 via a network connection 125. The network monitor 110 is also coupled to an Ethernet network 130 via a second network connection 135. The FDDI network 120 communicates addresses with the network monitor 110 in a most significant bit (MSB) first, non-canonical hexadecimal form. Conversely, the Ethernet network 130 communicates addresses with the network monitor 110 in a least significant digit first, canonical hexadecimal form. The description of the invention in terms of the FDDI network 120 and the Ethernet network 130 is provided for illustrative purposes only. Accordingly, it will be appreciated that other types of computer networks or systems, in which digital data representation format conversion is desirable, may be used.

Figure 2:
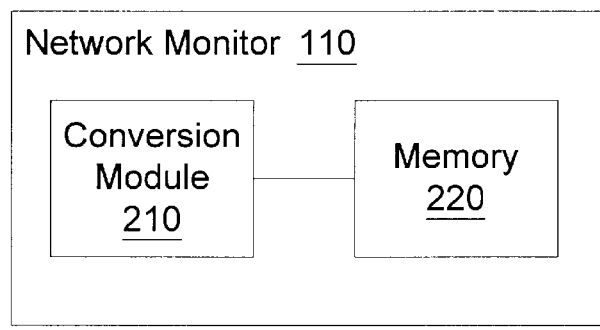
FIG. 2 shows a simplified block diagram illustrating the components of a network monitor of FIG. 1.

As shown in FIG. 2, the network monitor 110 includes a conversion module 210 that converts the particular network address format (i.e., digital data representation) used by either the FDDI network 120 or the Ethernet network 130 to another address format. In accordance with the illustrated embodiment, an address conversion from the FDDI network 120 would involve transformation from a MSB first, non-canonical hexadecimal format to a least significant digit first, canonical format used by the Ethernet network 130. On the other hand, an address conversion of an address from the Ethernet network 130 would involve transformation from a least significant digit first, canonical format to a MSB first, non-canonical format interpretable by the FDDI network 120.

In the illustrated embodiment, the network monitor 110 is a computer and the conversion module 210 is the computer's processor. The network monitor 110 further includes a memory 220 that is coupled to the conversion module 210. The memory 220 stores instructions that are executed by the conversion module 210 for converting between the different network address formats.

Figure 3:
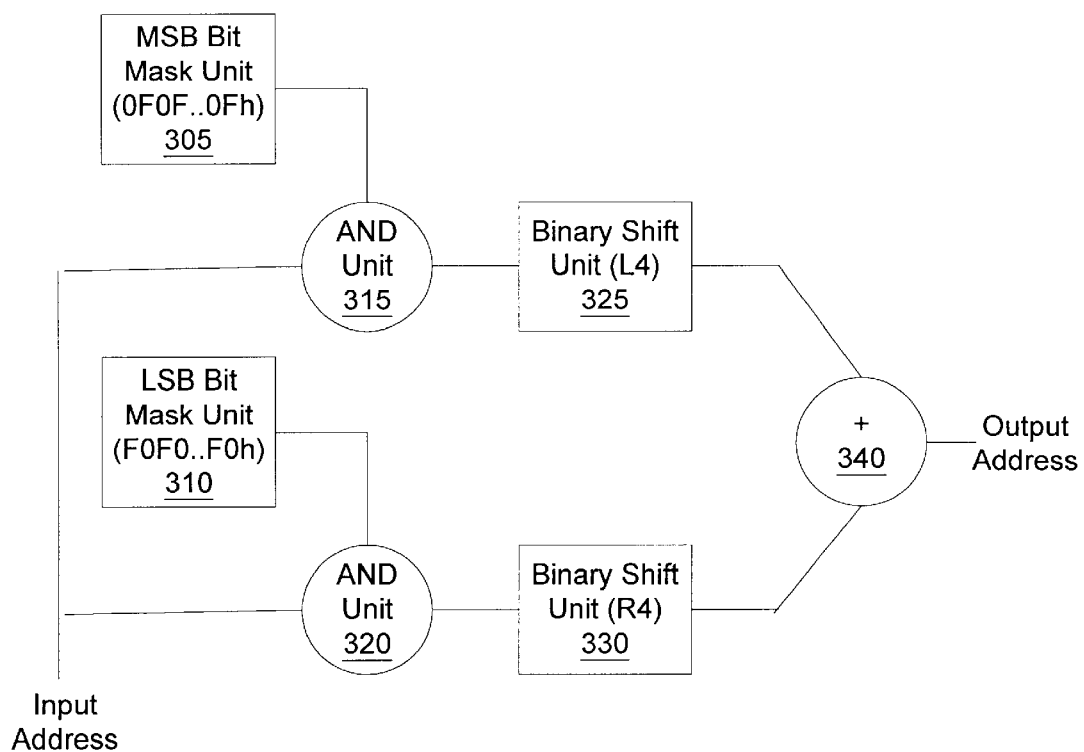
FIG. 3 is a functional block diagram for converting digital data representations in accordance with the present invention.

Turning now to FIG. 3, a functional block diagram illustrating the function of the conversion module 210 for converting between different network address formats is shown. The conversion module 210 implements a method, which is executed by instructions stored within the memory 220, for performing a conversion of the different address formats used by the FDDI and Ethernet networks 120, 130. In the illustrated embodiment, the method provides a bi-directional conversion of an MSB first, non-canonical address, which is typically used by the FDDI network 120, and a least significant digit first, canonical hexadecimal address that is typically used by the Ethernet network 130. It will be appreciated, however, that the application of the invention for converting from one particular address format to another could be applied to other digital data representations, and not specifically to that of network addresses as described in the illustrative embodiment.

As is known to those of ordinary skill in the art, a digit in the hexadecimal number system may represent any number from 0 to 15 (i.e., 10 in hexadecimal notation is 0xAh, 11 is 0xBh, 12 is 0xCh, 13 is 0xDh, 14 is 0xEh, and 15 is 0xFh). Accordingly, four binary bits, $B_0$, B1, $B_2$, $B_3$ are needed to binary encode each hexadecimal digit. These bits are weighted with numbers $2^3$, $2^2$, $2^1$ and $2^0$, so that a hexadecimal digit represented with binaries 0's and 1's is $B_3*2^3 + B_2*2^2 + B_1*2^1 + B_0*2^0$. The bit at the $2^0$ position is referred to as the least significant bit (LSB) of the digit, while the bit at the $2^3$ position is referred to as the most significant bit (MSB) of the digit.

The functions performed by the conversion module 210 are described as they might be broken down into "units," where a unit represents the portion of the instructions for implementing the method executed by the conversion module 210 that performs the described function. It will be further appreciated that random logic or other hardware may be used in lieu of the algorithm being executed by the conversion module 210 to affect the address conversion, depending on the specific implementation.

Turning now to FIG. 3, an MSB mask unit 305 is provided to "mask-out" the MSB bits of each byte of a hexadecimal input address that is to be converted. The MSB mask unit 305 is configured to provide a mask constant, 0x0F0 F0F . . . 0Fh, to an AND unit 315. The AND unit 315 subsequently masks out the most significant bits of the original input address by performing a bitwise AND operation with the mask constant 0x0F0F0F . . . 0Fh and the input address. A binary shift unit 325 subsequently shifts the masked most significant bits output from the AND unit 315 to the left by four bits. The output of the binary shift unit 325 yields a first resultant.

An LSB bit mask unit 310 is also provided to "mask-out" the least significant bits of each byte of the original hexadecimal address. The LSB mask 310 is configured to provide a mask constant 0xF0F0F0 . . . F0h to an AND unit 320. The AND unit 320 subsequently masks out the least significant bits of the original input address by performing a bitwise AND operation with the mask constant 0xF0F0F0 . . . F0h and the input address. A binary shift unit 330 subsequently shifts the masked least significant bits output from the AND unit 320 to the right by four bits. The output of the binary shift unit 330 yields a second resultant.

The first and second resultants that are respectively provided by the binary shift units 325, 330 are received by an adding unit 340 to be combined. It is contemplated that the function performed by the adding unit 340 may be an arithmetic AND function, or, alternatively, a logical OR function. The resultant sum provided by the adding unit 340 represents the output address, which has a complementary relationship with the input address. Hence, if the input address is in a MSB first, non-canonical format, then the output address is provided in a least significant digit first, canonical format. Likewise, if the input address is in a least significant digit first, canonical format, then the output address is provided in a MSB first, non-canonical format. The function performed by the conversion module 210 is bi-directional in that it may be used for canonical to non-canonical conversions as well as for non-canonical to canonical conversions. Repeating the conversion twice on a particular input address will return the original input address.

Those of ordinary skill in art will appreciate that, in an actual embodiment, a similar procedure as the one described in reference to FIG. 3 may be used for conversions within number systems other than hexadecimal. To use a different number system, the number of masking and shifting functions may be changed in accordance with the base of the number being converted. Also, those of ordinary skill in the art will appreciate that the actual implementation of the conversion, whether provided by software or hardware, may be performed in a parallel or serial fashion for the MSB and LSB masking operations.

Figure 4:
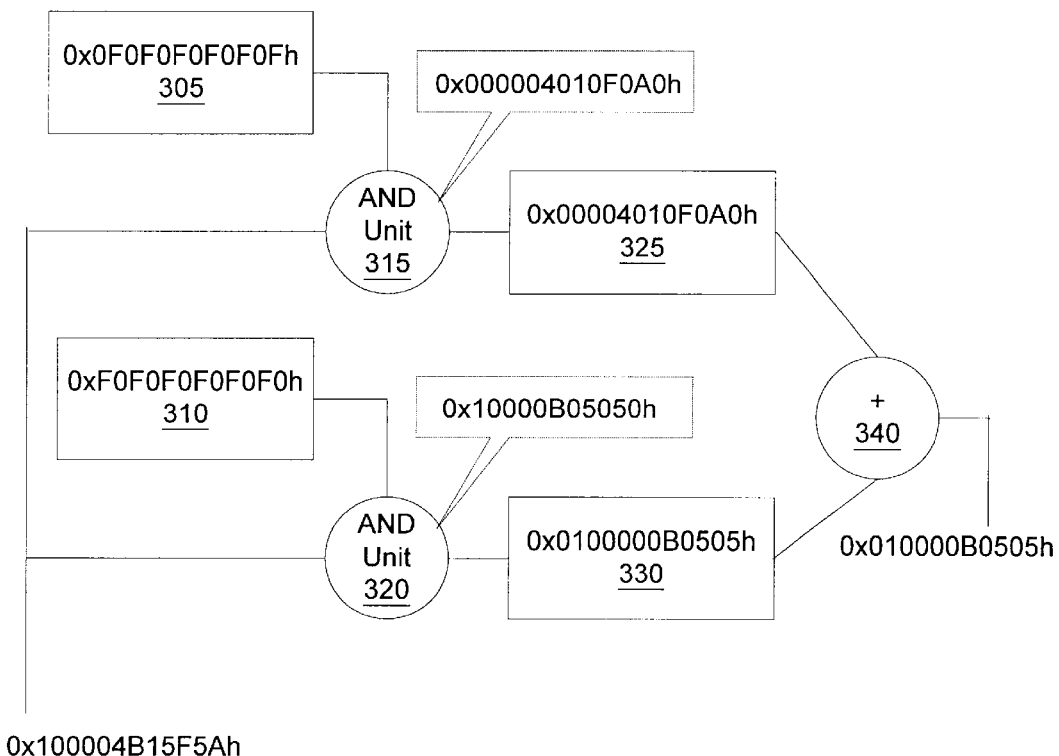
FIG. 4 is a functional block diagram illustrating a specific example of a network address conversion.

Turning now to FIG. 4, an example of a specific conversion of a hexadecimal input address 0x100004B15F5Ah is shown. The process of converting this hexadecimal network address is described to aid in comprehending the present invention.

The hexadecimal input address 0x100004B15F5Ah includes six bytes (i.e., "10" is the first byte, "00" is the second byte, "04" is the third, "B1" is the fourth, "F5" is the fifth, and "5A" is the sixth byte). Each byte includes two digits, with each digit including four binary bits. The first byte "10" includes a most significant digit of "1" and a least significant digit of "0". The second byte "00" includes both a most and least significant digit of "0", the third byte "04" includes a most significant digit of "0" and a least significant digit of "4", and so forth.

The MSB mask unit 305 provides the mask constant 0x0F0F0F . . . 0Fh to the AND unit 315. The AND unit 315 subsequently masks out the most significant digit bits of the original input address 0x100004B15F5Ah by performing a bitwise AND operation with the mask constant 0x0F0F0F . . . 0Fh. The output from the AND unit 315 yields 0x000004010F0A0h.

Subsequently, the binary shift unit 325 shifts the masked most significant digit bits 0x000004010F0A0h output from the AND unit 315 to the left by four bits. That is, the effect of shifting left by four bits is to move each digit of the number left by one. Thus, the output of the binary shift unit 325 yields a first resultant 0x00004010F0A0h.

The LSB bit mask unit 310 provides the mask constant 0xF0F0F0 . . . F0h to the AND unit 320. The AND unit 320 subsequently masks out the least significant digit bits of the original input address 0x100004B15F5Ah by performing a bitwise AND operation with the mask constant 0xF0F0F0 . . . F0h. The output from the AND unit 320 subsequently yields 0x100000B05050h.

The binary shift unit 330 subsequently shifts the masked least significant digit bits 0x100000B05050h output from the AND unit 320 to the right by four bits. That is, the effect of shifting right by four bits is to move each digit of the number right by one. Accordingly, the output of the binary shift unit 330 yields a second resultant 0x0100000B0505h.

The first and second resultants (i.e., 0x00004010F0A0h and 0x0100000B0505h) that are respectively provided by the binary shift units 325 and 330 are received by the adding unit 340 and are summed. Accordingly, the output address (i.e., the converted address) becomes 0x0100000B0505h, which is the least significant digit first, canonical representation of the input address 0x100004B15F5Ah.

Figure 5:
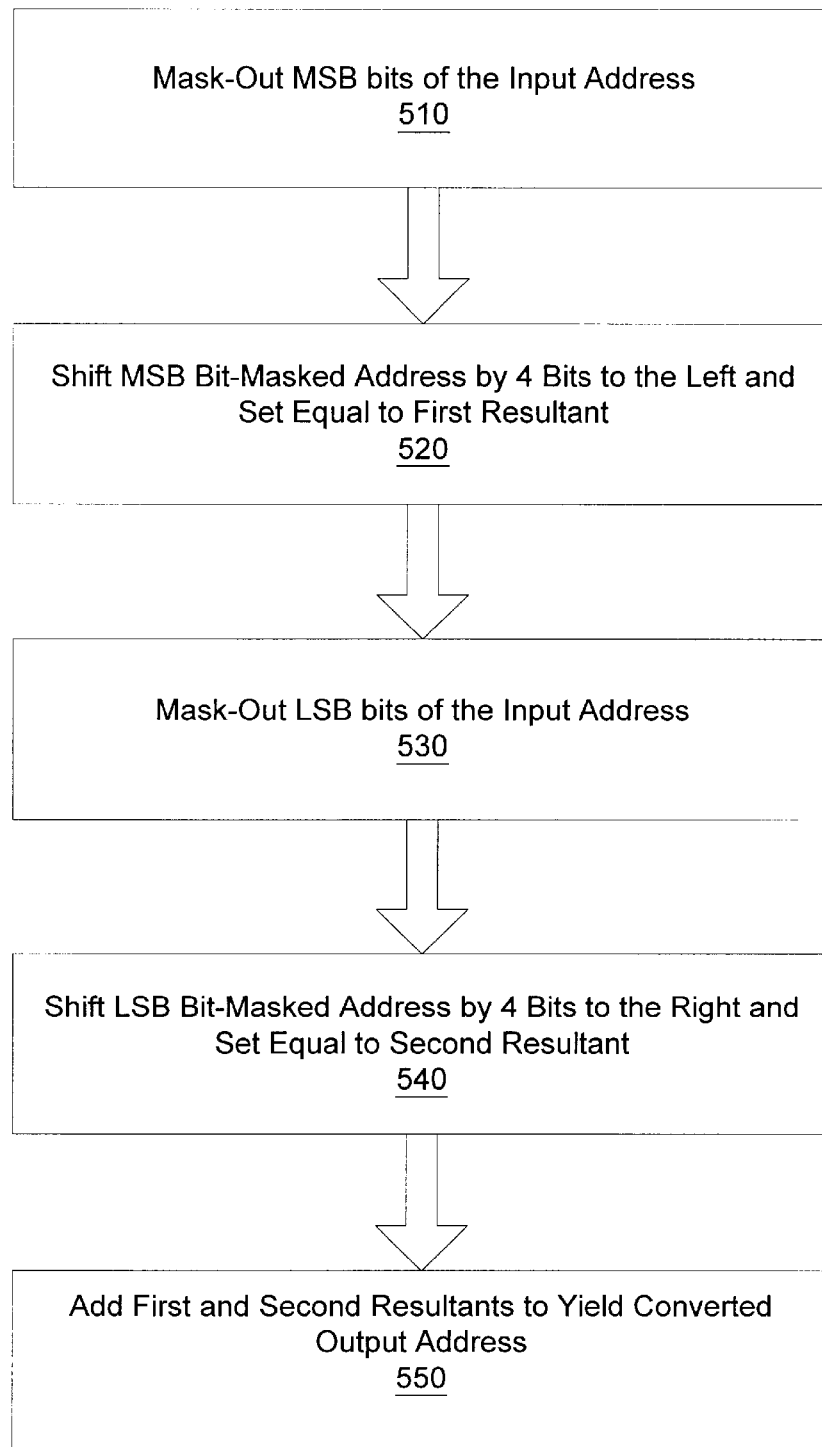
FIG. 5 illustrates a process for converting a digital data representation between a first and second format in accordance with the present invention.

Turning now to FIG. 5, a process 500 performed by the conversion module 210 for converting network addresses between a MSB first, non-canonical format and a least significant digit first, canonical format, and vice-versa, is shown. The process 500 commences at step 510 where the MSB bits of the input address are masked out. This is accomplished by performing a bitwise AND operation between the input address and an MSB mask constant 0x0F0F0F . . . 0Fh. The resultant MSB bit-masked address is subsequently shifted by 4 bits to the left at step 520 to yield the first resultant.

At step 530, the least significant digit bits of the original input address are masked out. This is accomplished by performing a bitwise AND operation between the input address and an LSB mask constant 0xF0F0F0 . . . F0h. In one embodiment, the least significant digit bits are masked from the input address substantially simultaneously as the most significant digit bits are masked out from the input address. That is, the steps 510 and 530 could be performed in parallel. Alternatively, the steps 510 and 530 could be performed sequentially, if so desired.

Subsequent to masking out the LSB bits at step 530, the process 500 proceeds to step 540, where the LSB bit-masked address is subsequently shifted four bits to the right to yield the second resultant. The first and second resultants produced by steps 520 and 540, respectively, are added at step 550, which produces the converted output address.

Converting between MSB first, non-canonical representations and least significant digit first, canonical representations as described above allows trace files, log files, or other information of a computer network to be analyzed in a more efficient and accurate manner. The time required for converting addresses for comparison is greatly reduced, and the likelihood of a conversion error is minimized.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for converting digital data representations, comprising:

receiving input data, the input data including a plurality of bytes, each byte having a plurality of digits arranged in positions;

selecting a first set of digits from the bytes having a first digit position;

shifting the digits in the first set of digits to a second digit position to generate a first resultant;

selecting a second set of digits from the bytes having a third digit position;

shifting the digits in the second set of digits to a fourth digit position to generate a second resultant; and combining the first and second resultants to generate output data.

2. The method of claim 1, wherein selecting a first set of digits further includes:
   masking all the digits except those in the first digit position.

3. The method of claim 2, wherein masking all the digits of the plurality of bytes except those in the first digit position further includes:
   defining a first mask constant to mask the most significant digits of each byte; and
   combining the first mask constant and the input data with a logical AND operation.

4. The method of claim 1, wherein selecting a second set of digits includes:
   masking all the digits except those in the third digit position.

5. The method of claim 4, wherein masking all the digits of the plurality of bytes except those in the third digit position includes:
   defining a second mask constant to mask the least significant digits of each byte; and
   combining the second mask constant and the input data with a logical AND operation.

6. The method of claim 1, wherein shifting the digits in the first set of digits to a second digit position includes:
   shifting the digits in the first set of digits by one digit to the left.

7. The method of claim 1, wherein shifting the digits in the second set of digits to a fourth digit position includes:
   shifting the digits in the second set of digits by one digit to the right.

8. The method of claim 1, wherein combining the first and second resultants includes:
   adding the first and second resultants.

9. The method of claim 1, wherein selecting the first set of digits and said selecting the second set of digits occur in parallel.

10. The method of claim 1, wherein receiving input data includes:
    receiving an address, the address including a plurality of bytes, with each byte having a plurality of digits arranged in positions.

11. An apparatus, comprising:
    a processor adapted to receive input data, the input data including a plurality of bytes, each byte having a plurality of digits arranged in positions; and
    a program storage device coupled to the processor and adapted to store instructions, that when executed by the processor, perform a method, comprising:
        selecting a first set of digits from the bytes having a first digit position;
        shifting the digits in the first set of digits to a second digit position to generate a first resultant;
        selecting a second set of digits from the bytes having a third digit position;
        shifting the digits in the second set to a fourth digit position to generate a second resultant; and
        combining the first and second resultants to generate output data.

12. The apparatus of claim 11, wherein selecting a first set of digits further includes masking all the digits except those in the first digit position.

13. The apparatus of claim 12, wherein masking all the digits of the plurality of bytes except those in the first digit position further includes:
    defining a first mask constant to mask the most significant digits of each byte; and
    combining the first mask constant and the input data with a logical AND operation.

14. The apparatus of claim 11, wherein selecting a second set of digits includes masking all the digits except those in the third digit position.

15. The apparatus of claim 14, wherein masking all the digits of the plurality of bytes except those in the third digit position includes:
    defining a second mask constant to mask the least significant digits of each byte; and
    combining the second mask constant and the input data with a logical AND operation.

16. The apparatus of claim 11, wherein shifting the digits in the first set of digits to a second digit position includes shifting the digits in the first set of digits by one digit to the left.

17. The apparatus of claim 11, wherein shifting the digits in the second set of digits to a fourth digit position includes shifting the digits in the second set of digits by one digit to the right.

18. The apparatus of claim 11, wherein combining the first and second resultants includes adding the first and second resultants.

19. The apparatus of claim 11, wherein selecting the first set of digits and selecting the second set of digits occur in parallel.

20. The apparatus of claim 11, wherein receiving input data includes receiving an address, the address including a plurality of bytes, with each byte having a plurality of digits arranged in positions.

21. An apparatus, comprising:
    means for receiving input data, the input data including a plurality of bytes, each byte having a plurality of digits arranged in positions;
    means for selecting a first set of digits from the bytes having a first digit position;
    means for shifting the digits in the first set of digits to a second bit position to generate a first resultant;
    means for selecting a second set of digits from the bytes having a third digit position;
    means for shifting the digits in the second set of digits to a fourth digit position to generate a second resultant; and
    means for combining the first and second resultants to generate output data.

* * * * *